United States Patent
Mays et al.

(10) Patent No.: US 6,275,157 B1
(45) Date of Patent: *Aug. 14, 2001

(54) EMBEDDED RFID TRANSPONDER IN VEHICLE WINDOW GLASS

(75) Inventors: Wesley M. Mays, Albuquerque; Peter Scott Hughes, Rio Rancho, both of NM (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/401,619

(22) Filed: Sep. 21, 1999

Related U.S. Application Data

(63) Continuation-in-part of application No. 09/321,506, filed on May 27, 1999, now Pat. No. 6,121,880.

(51) Int. Cl.[7] .................................................... G08B 13/14
(52) U.S. Cl. ............................. 340/572.5; 340/572.7; 340/572.8; 340/825.34
(58) Field of Search ...................... 340/572.1, 572.5, 340/572.8, 572.7, 825.34, 825.54, 572.2, 572.4, 572.9

(56) References Cited

U.S. PATENT DOCUMENTS

| | | |
|---|---|---|
| 3,579,243 | 5/1971 | Dickason et al. . |
| 3,599,214 | 8/1971 | Altmayer . |
| 3,615,986 | 10/1971 | Dickason et al. . |
| 3,618,102 | 11/1971 | Dickason et al. . |
| 4,768,037 | 8/1988 | Inaba et al. . |
| 4,782,345 | 11/1988 | Landt . |
| 4,786,907 | 11/1988 | Koelle . |
| 4,816,839 | 3/1989 | Landt . |
| 5,005,020 | 4/1991 | Ogawa et al. . |
| 5,508,684 * | 4/1996 | Beker ..................... 340/572 |
| 5,661,473 | 8/1997 | Paschal . |
| 5,670,966 | 9/1997 | Dishart et al. . |
| 5,748,155 | 5/1998 | Kadunce et al. . |
| 5,771,021 | 6/1998 | Veghte et al. . |
| 5,963,132 * | 10/1999 | Yoakum ................. 340/572.1 |
| 5,973,598 * | 10/1999 | Beigel .................... 340/572.1 |
| 5,995,898 | 11/1999 | Tuttle . |
| 6,025,725 * | 2/2000 | Gershenfeld .............. 324/652 |
| 6,027,027 * | 2/2000 | Smithgall .................. 235/488 |
| 6,031,459 * | 2/2000 | Lake ....................... 340/572.8 |
| 6,035,677 * | 3/2000 | Janssen ..................... 70/278.3 |
| 6,075,707 * | 6/2000 | Ferguson .................... 361/750 |
| 6,121,880 * | 9/2000 | Scott ....................... 340/572.5 |

* cited by examiner

*Primary Examiner*—Jeffery Hofsass
*Assistant Examiner*—Anh La
(74) *Attorney, Agent, or Firm*—O'Melveny & Myers LLP

(57) ABSTRACT

An RFID transponder is embedded in a glass surface, such as a vehicle windshield, to provide for the storage and retrieval of vehicle related data. In an embodiment of the invention, the RFID device comprises a flexible circuit substrate with an antenna formed thereon and a transponder circuit disposed on the substrate and coupled to the antenna. In a multi-layer glass panel, the RFID device is disposed between adjacent ones of the glass layers and becomes embedded therein upon lamination of the glass layers together. Alternatively, the RFID device may be formed using one of the glass layers as a substrate, thereby avoiding the need for a distinct substrate layer. Where a glass panel has a transparent conductive layer for thermal insulation, the transparent conductive layer may be used to form a conductive portion of the RFID device. In a single layer glass panel, the RFID device is embedded into the glass while the glass is in a molten or plastic state.

34 Claims, 3 Drawing Sheets

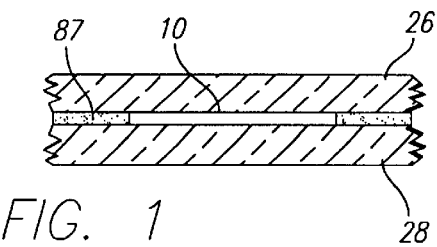
FIG. 1
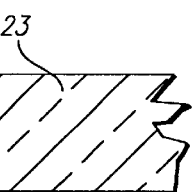
FIG. 3
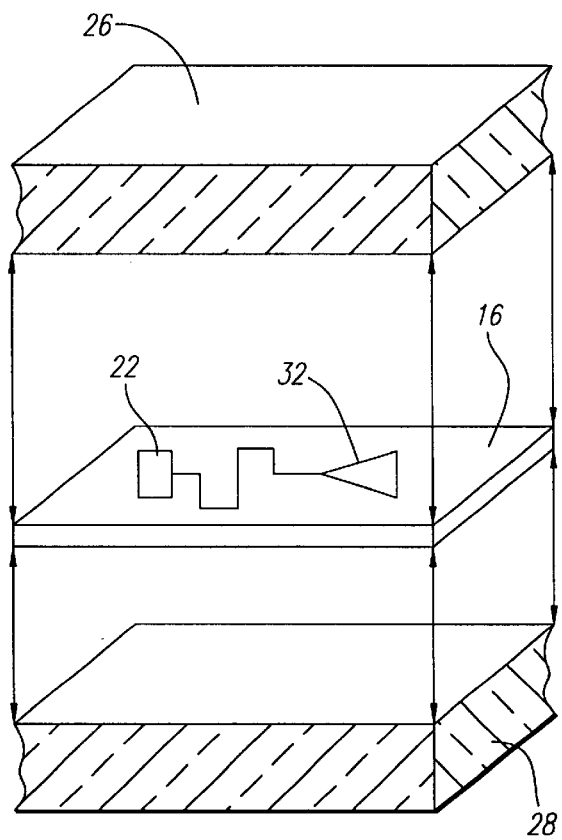
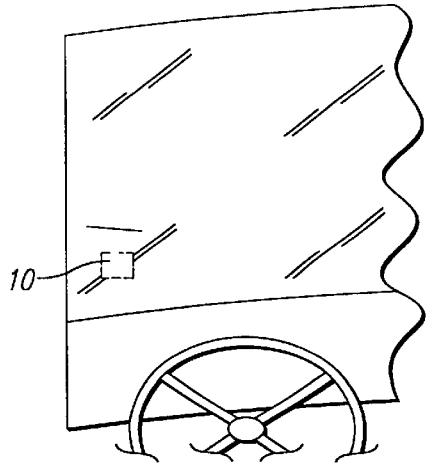
FIG. 4
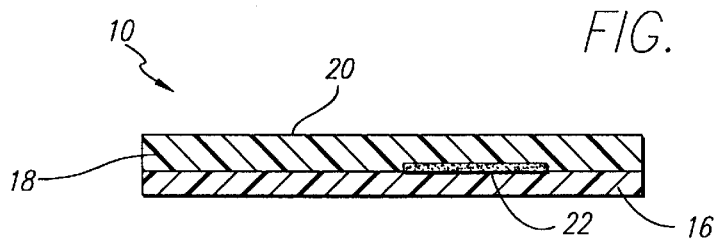
FIG. 5

EMBEDDED RFID TRANSPONDER IN VEHICLE WINDOW GLASS

RELATED APPLICATION DATA

The present application claims priority under 35 U.S.C. §120 as a continuation-in-part to U.S. patent application Ser. No. 09/321,506, filed May 27, 1999, now U.S. Pat. No. 6,121,080 entitled "Sticker Transponder For Use On Glass Surface," which is incorporated by reference herein in its entirety.

BACKGROUND OF THE INVENTION

1. Field of the Invention

The present invention relates to radio frequency identification (RFID) systems, and more particularly, to a vehicle windshield containing an embedded RFID transponder permitting vehicle-related data to be readily stored, remotely accessed, and updated.

2. Description of Related Art

Every one of the millions of motor vehicles operating in this country and abroad has associated vehicle-related data that must be made readily accessible to the operator and others. For example, certain state and local governments require certain kinds of vehicle-related data to be displayed on the exterior of the vehicle, such as current vehicle registration, safety inspection, valid handicap status certification, and emission control certification. Law enforcement personnel may additionally require other kinds of vehicle-related data to be maintained within the vehicle, such as proof of ownership and insurance coverage. The vehicle owner/operator and/or other private entities may additionally require still other kinds of vehicle-related data in the course of ordinary use of the vehicle, such as for parking access validation, monitoring and revenue collection. Separate tracking and storage systems exist for each of these different types of vehicle-related data.

The most common form of vehicle-data storage device is a sticker containing alphanumeric data. Vehicle stickers may be imprinted with colorful indicia and/or data, and can be affixed to the exterior of a vehicle in a highly visible manner. Moreover, vehicle stickers cannot be easily removed from a vehicle, making them inherently theft-resistant. A significant drawback with vehicle stickers is that their information capacity is rather limited and cannot be easily updated. As a result, vehicle operators must periodically replace or cover over expired stickers with new stickers. The difficulty of removing expired stickers is also a disadvantage, as many vehicle owners consider the proliferation of vehicle stickers to be an eyesore that mars the beauty and value of their vehicle.

Another common form of vehicle-data storage device is a card encoded with data, such as human-readable data (i.e., alphanumeric characters) or machine-readable data (i.e. optical indicia, such as bar code symbols, or magnetically recorded data). An advantage of an encoded card is that it generally has a much greater data capacity than that of a sticker. Nevertheless, the card is not affixed to the vehicle exterior and must therefore be kept either within the vehicle or on the vehicle operator's person, thereby increasing the risk that the card will be lost or stolen. Another drawback with an encoded card is that it is usually not visible from the exterior of the vehicle to the same degree as a sticker.

In the automatic data identification industry, the use of RFID transponders (also known as RFID tags) has grown in prominence as a way to obtain data regarding an object onto which an RFID transponder is affixed. An RFID transponder generally includes a semiconductor memory in which information may be stored. An RFID interrogator containing a transmitter-receiver unit is used to query an RFID transponder that may be at a distance from the interrogator and moving at highway speeds. The RFID transponder detects the interrogating signal and transmits a response signal containing encoded data back to the interrogator. Such RFID transponders may have a memory capacity of several kilobytes or more, which is substantially greater than the maximum amount of data that may be contained in a bar code symbol or other types of human-readable indicia. Further, the RFID transponder memory may be re-written with new or additional data, which would not be possible with a printed bar code symbol. RFID transponders may also be readable at a distance without requiring a direct line-of-sight view by the interrogator, unlike bar code symbols or other types of human-readable indicia that must be within a direct line-of-sight and which may be rendered entirely unreadable if obscured or damaged.

While RFID transponders are increasingly used with vehicles, such as for vehicle toll collection, RFID transponders have not been uniformly accepted as a vehicle-related data storage device. One reason for this lack of commercial acceptance stems from the size of the RFID transponder package, which has been driven in part by the size requirements of the antenna. The RFID transponders cannot be obscured by metallic objects that would impede RF communication with the RFID transponders. While the RFID transponders can be provided in a package that may be mounted inside or outside of the vehicle, such packages are susceptible to theft, weathering and damage, and do not convey visual information to the same degree as a vehicle sticker. Another drawback with RFID transponders is that automobile manufacturers are including conductive layers within vehicle windshields, which hinders the ability to communicate with an RFID transponder disposed within the vehicle. A final drawback of RFID systems is the lack of standardization between data formats necessary to permit different types of vehicle-related data to be stored in a single device. An industry group referred to as the Dedicated Short-Range Communication (DSRC) has formed a subcommittee to develop a uniform standard for vehicle RFID systems, but to date no such uniform standard has been adopted.

Accordingly, it would be desirable to provide an unobtrusive and theft-resistant form of vehicle-related data storage device that includes relatively high data capacity, security and re-write capability.

SUMMARY OF THE INVENTION

In accordance with the teachings of the present invention, an RFID transponder is embedded in a glass surface, such as a vehicle windshield, to provide for the storage and retrieval of vehicle related data.

An embodiment of the invention comprises an RFID device having a flexible circuit substrate with an antenna formed thereon and a transponder circuit disposed on the substrate and coupled to the antenna. The RFID device is embedded in a glass panel. In a multi-layer glass panel, the RFID device is disposed between adjacent ones of the glass layers and becomes embedded upon lamination of the glass layers together. Alternatively, the RFID device may be formed using one of the glass layers as a substrate, thereby avoiding the need for a separate substrate layer. Where a glass panel has a transparent conductive layer for thermal insulation, the transparent conductive layer may be used to form a conductive portion of the RFID device. In a single layer glass panel, the RFID device is embedded into the glass while the glass is in a molten or plastic state.

In another alternative embodiment of the invention, the vehicle data transponder is provided in plural portions, with an antenna portion embedded in the glass panel and a distributed portion disposed externally of the glass panel. The distributed portion may include a receiver and/or transmitter that communicates with the embedded antenna through the glass, such as by a capacitive coupling link.

The vehicle data transponder may be used to store various types of data, such as data pertaining to a vehicle. For example, the read-only portion of the memory may be preprogrammed with data that cannot be altered, such as a vehicle identification number. Other types of data, such as vehicle registration data, safety certification data, and emission control certification data, may be stored in the re-writable portion of the memory and periodically updated to reflect current compliance status. Similarly, toll collection data may be stored in the memory, and an RFID reader may be provided in a toll collection station. This way, the toll collection data may be decremented each time the vehicle passes the toll collection station.

A more complete understanding of the vehicle transponder will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 1 is a sectional view of a vehicle data transponder in accordance with an embodiment of the present invention embedded between glass layers of a vehicle windshield;

FIG. 2 is an exploded view of the vehicle data transponder of FIG. 1;

FIG. 3 is a sectional view of a vehicle data transponder embedded in a single glass layer of a vehicle windshield;

FIG. 4 is a perspective view illustrating the vehicle data transponder embedded in the vehicle windshield;

FIG. 5 is an enlarged sectional view of a vehicle data transponder in accordance with an embodiment of the invention;

DETAILED DESCRIPTION OF THE PREFERRED EMBODIMENT

Figure 6:
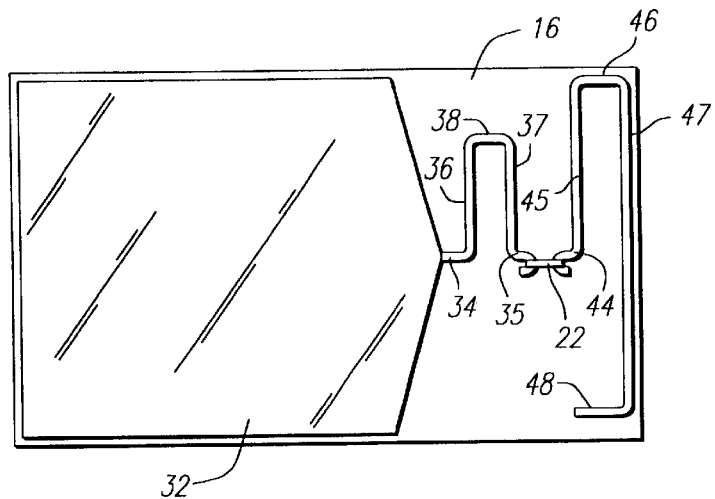
FIG. 6 is a top plan view illustrating a conductive pattern on a flex-circuit within an embodiment of the vehicle data transponder.

The present invention satisfies the need for a vehicle-related data storage device that includes relatively high data capacity and re-write capability. In the detailed description that follows, like element numerals are used to describe like elements illustrated in one or more of the figures.

Referring first to FIGS. 1 and 2, an exemplary RFID vehicle data transponder 10 in accordance with an embodiment of the present invention is shown. The vehicle data transponder 10 is embedded between layers of glass 26, 28, such as the windshield of a motor vehicle. Alternatively, as shown in FIG. 3, the vehicle data transponder 10 may be embedded within a single layer of glass 23. As known in the art, vehicle glass used in windshields is generally comprised of multiple glass layers that are laminated together in order to provide shatter-resistant characteristics. The vehicle data transponder 10 is disposed between the glass layers 26, 28 during the lamination process. An adhesive layer 87 is provided on one or both of the facing surfaces of the glass layers 26, 28, and the glass layers are compressed together to form a laminate glass structure. The vehicle data transponder 10 is consequently sealed between the glass layers 26, 28 in a permanent manner. Alternatively, FIG. 3 illustrates a vehicle data transponder 10 embedded in a single layer of glass 23. The vehicle data transponder 10 may be inserted into the glass material while it is in a molten or plastic state, and the transponder becomes permanently embedded in the glass after cooling. Single layer glass is still used for vehicle windows in certain countries.

The vehicle data transponder 10 may further comprise a generally rectangular shape having a facing surface 20 adapted to have indicia printed thereon. It should be appreciated that the printed indicia may include both human-readable and machine-readable information, data and characters, and may be printed using colored or black ink as desired. The types of indicia that may be printed on the facing surface 20 include, but are not limited to, vehicle identification or make/model information, manufacturer logos or product symbols, and the like. As shown in FIG. 4, the vehicle transponder 10 is disposed at a lower left-hand corner of a vehicle windshield, but it should be appreciated that the vehicle data transponder may also be embedded in any other vehicle glass surface, such as the vehicle side or rear windows, or sun roof. As known in the art, a typical vehicle windshield has a thickness of approximately 0.19 to 0.24 inches.

FIG. 5 illustrates an embodiment of the vehicle data transponder 10 in cross-section, and shows a generally laminate construction including a flexible circuit substrate layer 16 and an overlaminate layer 18. The flexible circuit substrate 16 is comprised of an electrically insulating material having a suitable dielectric constant, such as fiberglass or plastic, or other commercially available materials such as Kapton®, Mylar® or Pyralux®. The flexible circuit substrate 16 may further be comprised of transparent materials that would not obstruct the visible field of the vehicle driver. The overlaminate layer 18 has an exterior surface 20 that may be selectively printed with indicia, such as machine-readable or human-readable indicia as described above. An electronic circuit 22, such as an application specific integrated circuit (ASIC) or discrete logic components, is electrically connected to the flexible circuit substrate layer 16, such as by surface mounting techniques, as will be further described below. The flexible circuit substrate 16 additionally includes an antenna provided thereon, as will also be further described below. It is anticipated that the flexible circuit substrate layer 16 have a thickness as small as possible, such as less than $\frac{1}{16}$ inch, in order to keep the overall thickness of the vehicle data transponder 10 to a minimum.

Referring now to FIG. 6, a plan view of a component side surface of the flexible circuit substrate layer 16 is illustrated. A conductive material 32 is disposed on the surface of the flexible circuit substrate layer 16 facing the transparent adhesive layer 14. The conductive material 32 may be formed from a thin sheet of suitable material such as copper that has been selectively etched to leave a desired circuit pattern. Alternative methods, such as electro-coating, depositing, sputtering or printing a conductive material, may also be utilized to provide the conductive material 32, as generally known in the art. As shown in FIG. 6, the conductive material 32 is provided in a trapezoidal configuration that covers approximately ⅔ of the surface area of the flexible circuit substrate layer 16. A first end portion of the trapezoidal region corresponds to the rectangular shape of the flexible circuit substrate layer 16, and a second end portion culminates in an apex disposed approximately at a median position between opposite side edges of the flexible circuit substrate layer.

The flexible circuit substrate layer 16 further includes the application specific integrated circuit 22 coupled to electrical terminals provided on the flexible circuit substrate layer using conductive material. The application specific integrated circuit 22 may be electrically connected to the flexible circuit substrate layer 16 using known techniques, such as surface mount, wire-bond, flip-chip, or conductive adhesive technologies. First elongated regions 34–38 are electrically coupled between the apex of the trapezoidal region and one of the electrical terminals of the integrated circuit 22, and second elongated regions 44–48 are coupled to a second one of the electrical terminals. The elongated regions 34–38, 44–48 are comprised of conductive material formed in the same manner as the conductive material 32 described above. For illustrative purposes, a dipole antenna is shown in FIG. 6. As will be further described below, these separated elongated regions provide poles of the dipole antenna for the RFID transponder in which length along the lengthwise dimension of the flexible circuit substrate layer 16 (i.e., regions 34, 38, 35, and 44, 46) should be approximately ¼ of a wavelength at the frequency of operation of the antenna. In the preferred embodiment of the invention, the frequency of operation is approximately 915 MHz. In actuality, the combined lengths of the poles of the dipole antenna can be increased somewhat due to the effect of the trapezoidal region. The portions of the elongated regions that extend in the widthwise dimension (i.e., regions 36, 37, and 45, 47) comprise tuning stubs that provide an impedance matching function, as will be further described below. It should be appreciated that the particular arrangement of the antenna on the flexible circuit substrate layer 16 will determine its polarization with respect to receiving and transmitting RF signals. It should also be appreciated that the present invention would not be limited to using a particular type of antenna, but that any type of antenna formed on the flexible circuit substrate layer 16 such as a patch, loop, meander or folded dipole may also be advantageously utilized.

Figure 7:
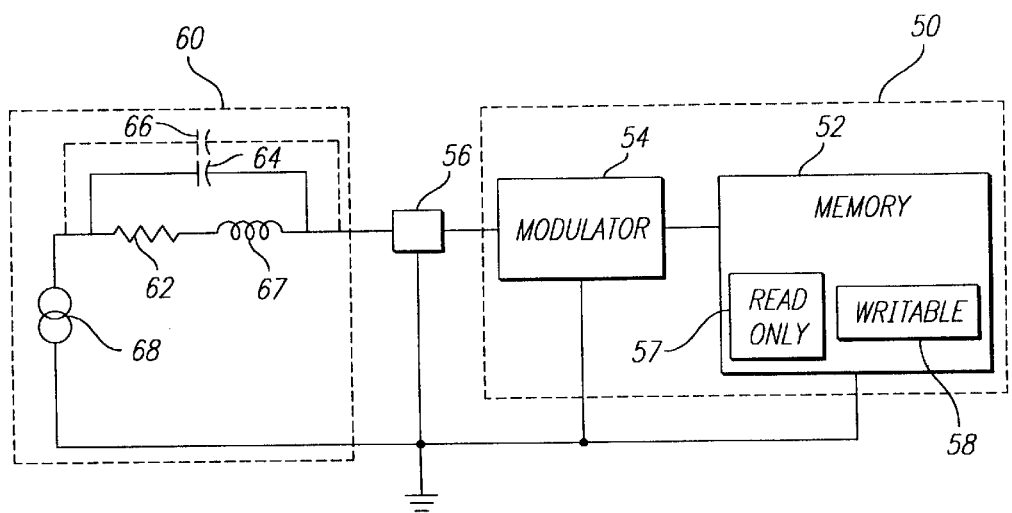
FIG. 7 is a simplified electrical diagram of the vehicle data transponder including an antenna and transponder circuit assembly.

Referring now to FIG. 7, an exemplary circuit schematic of an RFID vehicle data transponder 10 is shown. The antenna is represented within the dotted box 60. The antenna 60 generates an alternating voltage from the signal transmitted from an RFID reader (not shown) represented by a generator 68. The impedance of the antenna 60 is represented by a capacitor 64 in parallel with a resistor 62 and an inductor 67. An impedance matching section 56 connects the antenna 60 to a transponder circuit 50, which includes a modulator 54 and a memory 52. As described above, the tuning stubs (i.e., regions 36, 37, and 45, 47) provide the impedance matching section 56. The modulator 54 provides the function of communicating data signals to and from the antenna 60, and the memory 52 provides the function of storing data. The memory 52 may include a writable portion 58 that may be selectively written-to by a remote reader, and may also include a read-only portion 57 that includes data that may not be altered, such as the vehicle identification number (VIN). The transponder circuit 50 may further comprise an RFID transponder, such as disclosed by U.S. Pat. No. 4,786,907, issued Nov. 22, 1998, for "Transponder Useful In A System For Identifying Objects," the subject matter of which is incorporated by reference herein.

The exemplary circuit schematic further includes a capacitor 66 coupled in parallel with the impedance defined by the capacitor 64, resistor 62 and inductor 67. The capacitor 66 is a function of the dielectric constant of the glass material of the plural layers 26, 28 (see FIG. 1) or single layer 23 (see FIG. 3) having a thickness within a known range. When the vehicle data transponder 10 is embedded in the glass, the capacitor 66 is coupled in parallel with the capacitor 64, resistor 62 and inductor 67. The impedance matching section 56 is therefore intentionally tuned to match the relatively high impedance of the transponder circuit 50 to the relatively low impedance of the antenna 60 when the vehicle data transponder 10 is embedded in the glass.

In an alternative embodiment of the invention, the vehicle data transponder 10 may be constructed without the flexible circuit substrate layer 16. Instead, the vehicle data transponder 10 may be formed using the glass as a substrate layer. Specifically, the conductive elements of the vehicle data transponder 10, i.e., the elongated regions forming the dipole antenna, tuning stubs and electrical interconnections with the application specific integrated circuit 22, may be formed directly onto one of the glass layers 26, 28 or layer 23. Known fabrication methods, such as electro-coating, depositing, sputtering or printing a conductive material, may be utilized to form the conductive material onto the glass surface. The application specific integrated circuit 22 is thereafter coupled to the conductive elements in the same manner as described above. Subsequent lamination of the glass layers 26, 28 together embeds the vehicle data transponder 10 in the glass as described above.

Figure 8:
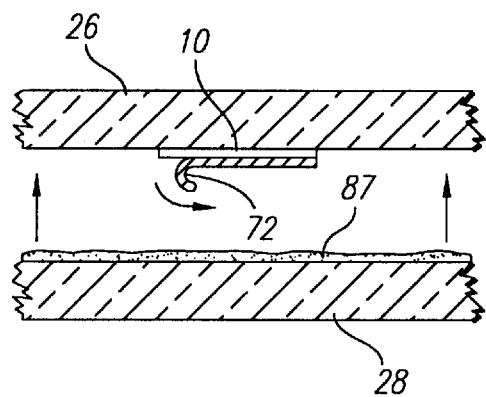
FIG. 8 is a sectional view of an alternative embodiment of a vehicle data transponder embedded in a vehicle window glass.

FIG. 8 illustrates a further variation of the alternative embodiment, in which the conductive elements of the vehicle data transponder 10 may be disposed on an applique having a release liner 72. The applique may further comprise an adhesive layer onto which a reverse pattern of the conductive elements and the application specific integrated circuit 22 are disposed. The applique may be pressed onto the surface of the glass layer 26, causing the conductive elements and application specific integrated circuit 22 to become affixed to the glass layer 26. The release liner 72 may be thereby removed or peeled away to leave the conductive elements and application specific integrated circuit 22 affixed to the glass surface. As described above, subsequent lamination of the glass layers 26, 28 together permanently embeds the vehicle data transponder 10 in the glass.

As known in the art, certain windshields are "metallized" in which a transparent film layer of conductive metal material (e.g., a few angstrom thickness) is provided between layers of the windshield glass or on an exterior surface of single or multiple layer glass. The metal material used in the metallized windshields has infrared reflecting properties that provide a certain level of thermal insulation by reducing infrared radiation heat transfer in order to reduce the vehicle cooling/warming load. The transparent conductive film may comprise a single layer of tin oxide, indium oxide, chromium, titanium, silver, gold, aluminum, copper or nickel. Further, a multi-layer transparent conductive film comprised of the aforementioned single layer material combined with layers of ZnO, $SnO_2$, $In_2O_3$, $TiO_2$, $Bi_2O_3$, $WO_3$, ZnS and the like may also be used. The transparent conductive film of the metallized windshield would ordinarily preclude RF communication with an RFID transponder disposed within the vehicle.

Figure 9:
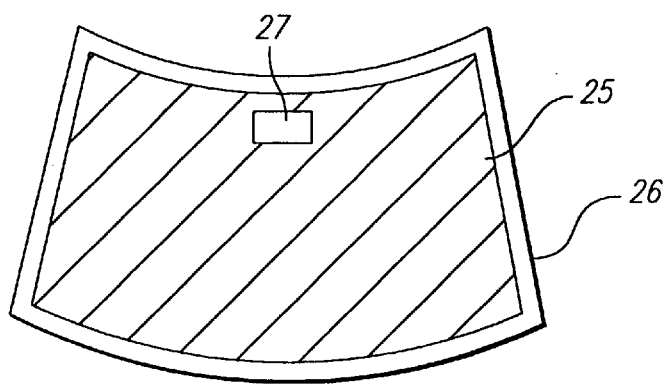
FIG. 9 is a plan view of a glass layer of a vehicle windshield illustrating a clear space in a conductive transparent layer.

To overcome this problem, an embodiment of the invention utilizes a clear space defined in the transparent conductive film. As shown in FIG. 9, a window layer 26 includes a transparent conductive film layer 25. The film layer 25 may be applied to the window layer 26 by known film-producing methods, such as vacuum deposition, chemical vapor deposition, sputtering, spraying, printing, etc. A clear space 27 is provided in an appropriate region of the film layer 25, such as in the upper center as shown. The clear space 27 may be formed by using a mask applied to the window layer 26 prior to applying the transparent conductive film layer 25. Alternatively, the conductive material of the film layer 25 may be selectively removed, such as by chemical etching, to produce the clear space 27. A vehicle data transponder may be thereafter disposed in the clear space 27 using any of the aforementioned techniques prior to laminating the window layer 26 to a second window layer 28. It should be appreciated that the precise location of the clear space 27 may be selected to minimize any impact on the vehicle driver's visible range, and that the size of the clear space 27 shown in FIG. 9 relative to the overall size of the conductive film layer 27 is exaggerated for ease of illustration.

Alternatively, the conductive film layer 25 may be used to form the conductive elements of the vehicle data transponder. Before, during or after applying the conductive film layer 25 to the glass 26, the pattern of the conductive elements may be formed on the conductive film layer. For example, a photolithographic process could be utilized in which a stencil having the conductive element pattern is used to apply a photoresist material to the conductive film layer 25. The photoresist material can be selected to react upon exposure to ultraviolet light, causing the conductive element pattern to be selectively etched into the conductive film layer 25. The application specific integrated circuit 22 is thereafter coupled to the conductive elements formed in the conductive film layer 25 in the same manner as described above. Subsequent lamination of the glass layers 26, 28 together embeds the vehicle data transponder 10 in the glass as described above.

Figure 10:
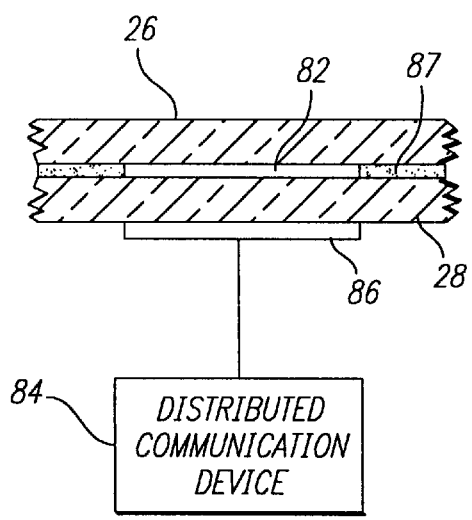
FIG. 10 is a sectional view of another alternative embodiment of a vehicle data transponder embedded in a vehicle window glass.

In yet another alternative embodiment of the invention, the vehicle data transponder can be distributed with the antenna portion embedded in the vehicle glass, and the electronic portion disposed externally of the vehicle glass. Referring to FIG. 10, an antenna portion 82 of a vehicle data transponder is embedded between glass layers 26, 28 or within glass layer 23 in the same manner as the embedded vehicle data transponder described above. A distributed communication device 84 is disposed externally of the glass, such as within the passenger compartment of the vehicle or built into the vehicle dashboard. The distributed communication device 84 may include the application specific integrated circuit, a receiver, a transmitter, a power source, or other related circuitry. The distributed communication device 84 communicates with the antenna portion 82, such as using a coupling device 86 affixed to the glass that forms a capacitive link with the antenna portion. Alternatively, a hard-wired link may be provided wherein a lead wire connected to the antenna portion 82 physically passes through or along a portion of the window glass 26, 28. In this embodiment, the antenna portion 82 may serve as a repeater for communications between the distributed communication device and an interrogation system outside the vehicle.

It should be appreciated that the vehicle data transponder of the present invention permits a remote RF signal to interrogate the encoded information stored within the memory 52 of the transponder circuit 50. This allows a vehicle having the embedded vehicle data transponder to be remotely identified as it is moving, even at high speeds. As a result, encoded information such as parking fees, toll collection, safety and smog certification and vehicle registration, etc. can be monitored remotely. Similarly, an interrogator provided in a moving vehicle can interrogate the vehicle data transponder in parked vehicle. For example, law enforcement personnel looking for stolen vehicles can cruise through a parking area interrogating all the embedded vehicle data transponders along the way. A stolen vehicle can thereby be identified even if its license plates are changed or removed, or the vehicle color has been altered. There are numerous other advantageous applications in which the vehicle data transponder may be interrogated.

Further, the encoded information can be updated remotely. For example, after the vehicle passes a periodic safety or smog inspection, a portion of the memory 52 could be updated with data identifying the inspection facility and the next expiration date. In another example, the vehicle data transponder can be used for toll collection wherein the transponder may be programmed for a certain number of fares or for a certain amount of time. The encoded data may be decremented each time the user passes the vehicle through an entry gate equipped with a suitable reader. It should be further appreciated that the transponder circuit 50 may be provided with sufficient memory to store all various types of encoded information, thereby eliminating the need for a plurality of vehicle stickers for different purposes. Unlike a sticker or card, the embedded vehicle data transponder cannot be easily removed from the vehicle or misplaced.

Having thus described a preferred embodiment of an embedded RFID transponder in a vehicle window glass, it should be apparent to those skilled in the art that certain advantages of the herein described system have been achieved. It should also be appreciated that various modifications, adaptations, and alternative embodiments thereof may be made within the scope and spirit of the present invention. The invention is further defined by the following claims.

What is claimed is:

1. A data transponder, comprising:
    a glass panel adapted for viewing visible light therethrough; and
    a radio frequency identification (RFID) device comprising a flexible substrate having an antenna and an integrated circuit disposed thereon, wherein said RFID device is at least partially embedded in said glass panel.

2. The data transponder of claim 1, wherein said glass panel further comprises plural glass layers laminated together, said RFID device being disposed between adjacent ones of said plural glass layers.

3. The data transponder of claim 1, wherein said glass panel further comprises a single glass layer.

4. The data transponder of claim 2, wherein said glass panel further comprises a transparent conductive layer disposed between adjacent ones of said plural glass layers, said plural glass layers further comprising a clear area wherein said conductive layer is not present, said RFID device being disposed in said clear area.

5. The data transponder of claim 2, wherein said RFID device further comprises an antenna provided directly onto a surface of one of said plural glass layers.

6. The data transponder of claim 2, wherein said glass panel further comprises a transparent conductive layer disposed between adjacent ones of said plural glass layers, said antenna being formed from a portion of said transparent conductive layer.

7. The data transponder of claim 3, wherein said glass panel further comprises a transparent conductive layer affixed thereto, said antenna being formed from a portion of said transparent conductive layer.

8. The data transponder of claim 1, wherein said flexible circuit substrate further comprises substantially transparent materials.

9. The data transponder of claim 1, further comprising an indicia layer coupled to said flexible circuit substrate, said indicia layer comprising a space permitting indicia to be printed thereon.

10. The data transponder of claim 1, wherein said glass panel further comprises a vehicle windshield.

11. The data transponder of claim 1, wherein said antenna further comprises a dipole antenna.

12. The data transponder of claim 1, wherein said antenna further comprises a patch antenna.

13. The data transponder of claim 1, wherein said integrated circuit further comprises a radio frequency identification (RFID) application specific integrated circuit.

14. The data transponder of claim 1, wherein said integrated circuit further comprises a memory.

15. The data transponder of claim 1, wherein said integrated circuit and said antenna are coupled together on said flexible substrate.

16. The data transponder of claim 1, wherein said RFID device is entirely embedded in said glass panel.

17. The data transponder of claim 1, wherein said RFID device further comprises an antenna embedded in said glass panel and a distributed device disposed externally of said glass panel.

18. The data transponder of claim 17, wherein said distributed device further comprises at least one of an RF receiver and transmitter.

19. The data transponder of claim 1, wherein said antenna has a operational characteristic impedance defined in part by a dielectric constant of said flexible circuit substrate in combination with a dielectric constant of said glass panel.

20. A method for making a data transponder, comprising the steps of:
providing a radio frequency identification (RFID) device comprising a flexible substrate having an antenna and an integrated circuit disposed thereon;
at least partially embedding said RFID device in a glass panel, wherein said glass panel is adapted for viewing visible light therethrough.

21. The method of claim 20, wherein said glass panel further comprises plural glass layers, and said embedding step further comprises disposing said RFID device between adjacent ones of said plural glass layers and laminating said plural glass layers together.

22. The method of claim 20, wherein said glass panel further comprises a single glass layer, and said embedding step further comprises disposing said RFID device in said glass layer while said layer is in a plastic state.

23. The method of claim 21, wherein said embedding step further comprises disposing a transparent conductive layer between adjacent ones of said plural glass layers prior to said laminating step.

24. The method of claim 23, further comprising providing a clear area in said transparent conductive layer wherein said conductive layer is not present, and disposing said RFID device in said clear area.

25. The method of claim 21, wherein said embedding step further comprises providing an antenna for said RFID device directly onto a surface of one of said plural glass layers.

26. The method of claim 25, wherein said step of providing an antenna further comprises at least one of printing, electro-coating, depositing, and sputtering conductive material onto said surface in a desired pattern.

27. The method of claim 23, wherein said embedding step further comprises fabricating an antenna for said RFID device from a portion of said transparent conductive layer.

28. The method of claim 27, wherein said fabricating step further comprises selectively etching a desired antenna pattern from said portion of said transparent conductive layer.

29. The method of claim 20, wherein said step of providing a flexible circuit substrate further comprises providing said flexible circuit substrate comprised of substantially transparent material.

30. The method of claim 20, further comprising coupling an indicia layer to said flexible circuit substrate, said indicia layer comprising a space permitting indicia to be printed thereon.

31. The method of claim 20, wherein said embedding step further comprises embedding said RFID device entirely within said glass panel.

32. The method of claim 20, wherein said embedding step further comprises embedding an antenna of said RFID device in said glass panel and disposing a distributed element of said RFID device externally of said glass panel.

33. The method of claim 21, wherein said step of providing an RFID device further comprises disposing at least conductive portions of said RFID device on an applique.

34. The method of claim 33, wherein said embedding step further comprises transferring said conductive portions of said RFID device from said applique to an interior surface of one of said plural glass layers.

\* \* \* \* \*